United States Patent [19]
Ohsawa et al.

[11] Patent Number: 5,263,452
[45] Date of Patent: Nov. 23, 1993

[54] KNOCKING DETECTOR FOR INTERNAL COMBUSTION ENGINE

[75] Inventors: Toshio Ohsawa; Wataru Fukui, both of Hyogo, Japan

[73] Assignee: Mitsubishi Denki K.K., Tokyo, Japan

[21] Appl. No.: 981,304

[22] Filed: Nov. 25, 1992

[30] Foreign Application Priority Data

Nov. 26, 1991 [JP] Japan .................. 3-310716

[51] Int. Cl.⁵ .................. F02P 5/14; F02M 51/00
[52] U.S. Cl. .................. 123/425; 123/494
[58] Field of Search .................. 123/425, 494; 73/35; 324/388

[56] References Cited

U.S. PATENT DOCUMENTS

| | | | |
|---|---|---|---|
| 4,232,545 | 11/1980 | Dobler et al. | 73/35 |
| 4,444,172 | 4/1984 | Sellmaier et al. | 123/425 |
| 4,491,110 | 1/1985 | Bone et al. | 123/425 |
| 4,648,367 | 10/1987 | Gillbrand et al. | 123/425 |
| 4,762,106 | 8/1988 | Blauhut | 123/425 |
| 5,005,547 | 4/1991 | Suga et al. | 123/425 |
| 5,067,462 | 11/1991 | Iwata et al. | 123/425 |
| 5,087,882 | 2/1992 | Iwata | 324/388 |
| 5,146,893 | 9/1992 | Ohsawa | 123/494 |

*Primary Examiner*—Raymond A. Nelli
*Attorney, Agent, or Firm*—Sughrue, Mion, Zinn, Macpeak & Seas

[57] ABSTRACT

A knocking device for an internal combustion engine which detects the ionization current through an ignition coil just prior to the time of ignition, and judges whether or not the ionization current is above a predetermined level after a predetermined time or crank angle from the ignition. If the ionization current is above the predetermined level, it is judged that knocking has taken place. Accordingly, knocking can be detected simply and surely.

15 Claims, 3 Drawing Sheets

KNOCKING DETECTOR FOR INTERNAL COMBUSTION ENGINE

BACKGROUND OF THE INVENTION

This invention relates to knocking detectors for internal combustion engines.

Conventional knocking detectors for internal combustion engines employ an acceleration sensor mounted adjacent to a cylinder of the engines, and subject an electric signal outputted from the acceleration sensor to frequency analysis to judge whether or not knocking has taken place, whose occurrence depends on running conditions of an automobile, etc.

The conventional knocking detectors for the internal combustion engines, constructed as described above, base knocking judgment on the output level of the acceleration sensor mounted on the engines. Therefore, noise (e.g., valve noise) other than knocking is also picked up by the acceleration sensor, which has made it necessary to put both knocking and other noise to frequency analysis for knocking judgment.

SUMMARY OF THE INVENTION

It is therefore an object of the invention to overcome the above problem and provide a knocking detector for an internal combustion engine which is capable of detecting knocking simply and surely without involving frequency analysis.

The above object is accomplished according to the principle of this invention by a knocking detector for an internal combustion engine, which comprises: an ignition coil for generating a high voltage for igniting the internal combustion engine; a spark plug for firing a mixed gas in the internal combustion engine by applying the high ignition voltage for spark; an ionization current detecting means for detecting the ionization current through the ignition coil and a knocking judging means for judging that knocking has taken place on the basis of whether or not the ionization current is above a predetermined level after a predetermined time or crank angle from the ignition timing.

According to this invention, the ionization current through the ignition coil is detected at the time of ignition and thereby allows knocking to be judged from the fact that the ionization current is above a predetermined level after a predetermined time or crank angle from the ignition.

BRIEF DESCRIPTION OF THE DRAWINGS

The novel features which are believed to be characteristic of this invention are set forth with particularity in the appended claims. This invention itself, however, may best be understood from the detailed description of the preferred embodiments taken in connection with the accompanying drawings, in which:

DETAILED DESCRIPTION OF THE PREFERRED EMBODIMENTS

Embodiments of this invention will be described with reference to the accompanying drawings.

Embodiment 1

Figure 1:
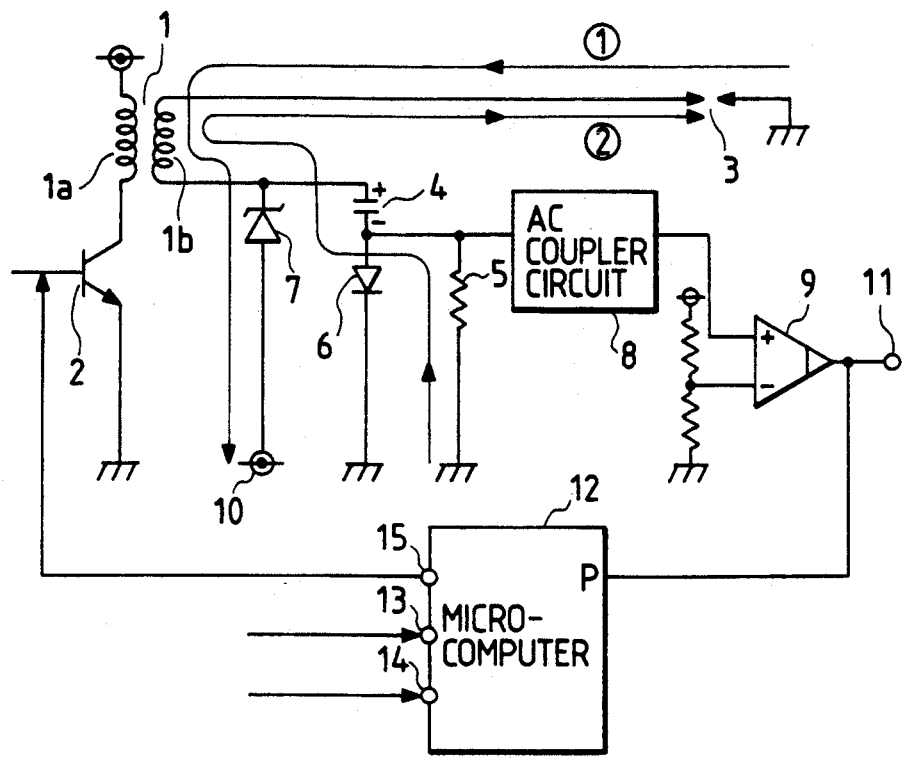
FIG. 1 is a diagram showing the organization of a knocking detector for an internal combustion engine, which is a first embodiment of the invention.

FIG. 1 shows the organization of a knocking detector, which is a first embodiment of this invention. Reference numeral 1 designates an ignition coil having a primary side 1a and a secondary side 1b; 2, a power transistor connected to the primary side 1a for cutting off the primary current; 3, a spark plug connected to the secondary side 1b for firing a mixed gas of a not shown internal combustion engine by applying a high ignition voltage; 4, a capacitor connected to the positive pole of the secondary side 1b; 5, a resistor inserted between the capacitor 4 and ground for converting ionization current to a voltage; 6, a diode connected to the resistor 5 in parallel therewith; and 7, a Zener diode inserted between the secondary side 1b and a detector power supply 10.

Reference numeral 8 designates an AC coupler circuit for extracting only an AC component out of the voltage obtained at the resistor 5; 9, a comparator circuit for comparing the AC component with a predetermined reference level; 11, an output terminal for outputting a combustion pulse at the time the ionization current has been detected; 12, a microcomputer for effecting various types of control; 13, an input terminal of the microcomputer 12 for inputting a rotational reference signal; 14, an input terminal of the microcomputer 12 for inputting load information; and 15, an output terminal of the microcomputer 12 for outputting a drive signal for driving the power transistor 2.

In the above organization, if conduction of the current to the primary side 1a is cut off by an ignition drive signal from the microcomputer 12 at the time of igniting the internal combustion engine, a negative high ignition voltage (about $-10$ to $-25$ kV) is generated at the secondary side 1b, generating a spark current to flow through the path indicated by (1). This spark current causes a spark across the electrodes of the spark plug 3, thus firing the mixed gas in the internal combustion engine. This spark current also charges the capacitor 4 in shown polarities, and the charged voltage can be set to an arbitrary value by the Zener diode. At this point, ionization takes place as the mixed gas is being burnt, generating ions.

Here, as electrons positively biased by the capacitor 4 (about 50 to 300 V) move, the ionization current flows through the path indicated by (2) in FIG. 1. The generation of the ionization current generates a voltage across the terminals of the resistor 5. The AC component of this generated voltage is extracted by the AC coupler circuit 8, and the AC component is then compared with a reference level by the comparator circuit 9 to thereby obtain a combustion pulse from the output terminal thereof 11. The obtained combustion pulse is applied to the microcomputer 12 to judge whether or not knocking has taken place from the condition (high or low) of the combustion pulse after a predetermined time t ms has elapsed from a predetermined ignition timing on the basis of a rotational reference signal and load information that have been applied separately.

Figure 2:
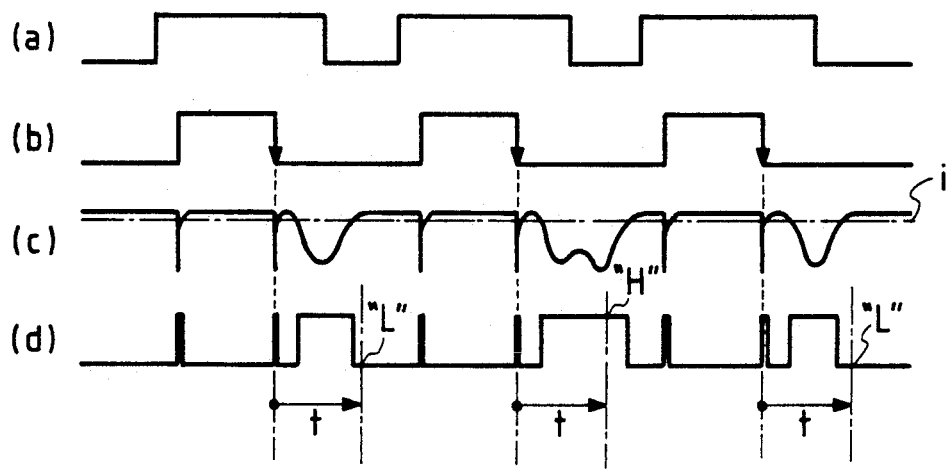
FIG. 2 is a timing chart showing the operation of the knocking detector of FIG. 1.

FIG. 2 is a timing chart showing the above operation. A waveform (a) indicates a rotational reference signal of the engine; (b), an ignition signal calculated from the rotational reference signal and the load information, the trailing edge coinciding with the ignition timing; (c), the ionization current flowing through the ignition coil 1 with (i) indicating the reference level of the comparator circuit 9; and (d), a combustion pulse outputted from the output terminal 11 with t being the predetermined time t ms from the ignition timing. If there is no knocking with the engine, the ionization current is soon damped. Thus, if the combustion pulse is low after t ms from the ignition timing, it is judged that no knocking has taken place, whereas if the combustion pulse is high, it is judged that knocking has taken place.

Embodiment 2

Figure 3:
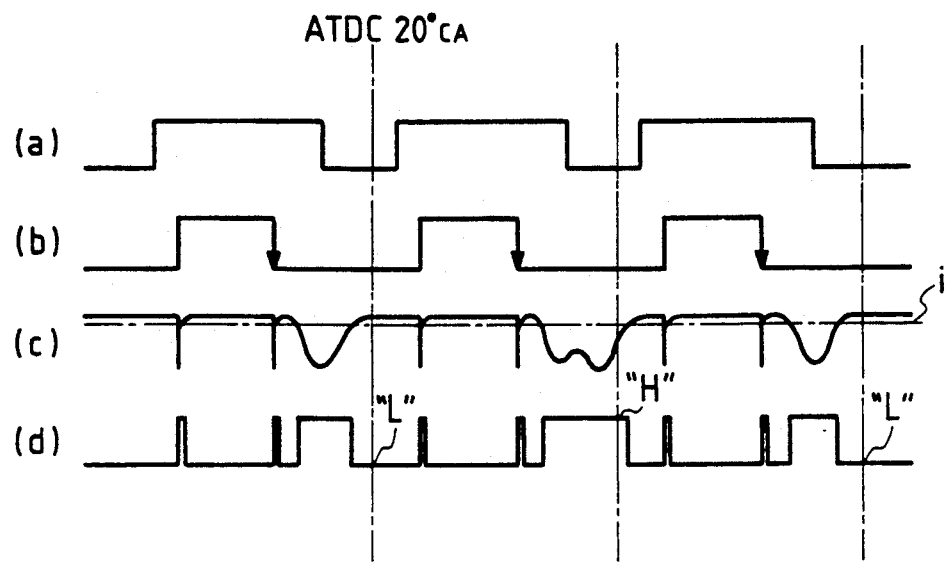
FIG. 3 is a timing chart showing the operation of a knocking detector for an internal combustion engine, which is a second embodiment of the invention.

FIG. 3 is a timing chart showing the operation of a second embodiment. Occurrence of knocking is judged by the combustion pulse condition at a predetermined crank angle, e.g., ATDC20° (the acronym ATDC standing for "after top dead center"). In this case, since the ignition signal is determined in accordance with the rotational reference signal, occurrence of knocking is judged from the combustion pulse condition after a predetermined crank angle from the ignition timing.

Embodiment 3

Figure 4:
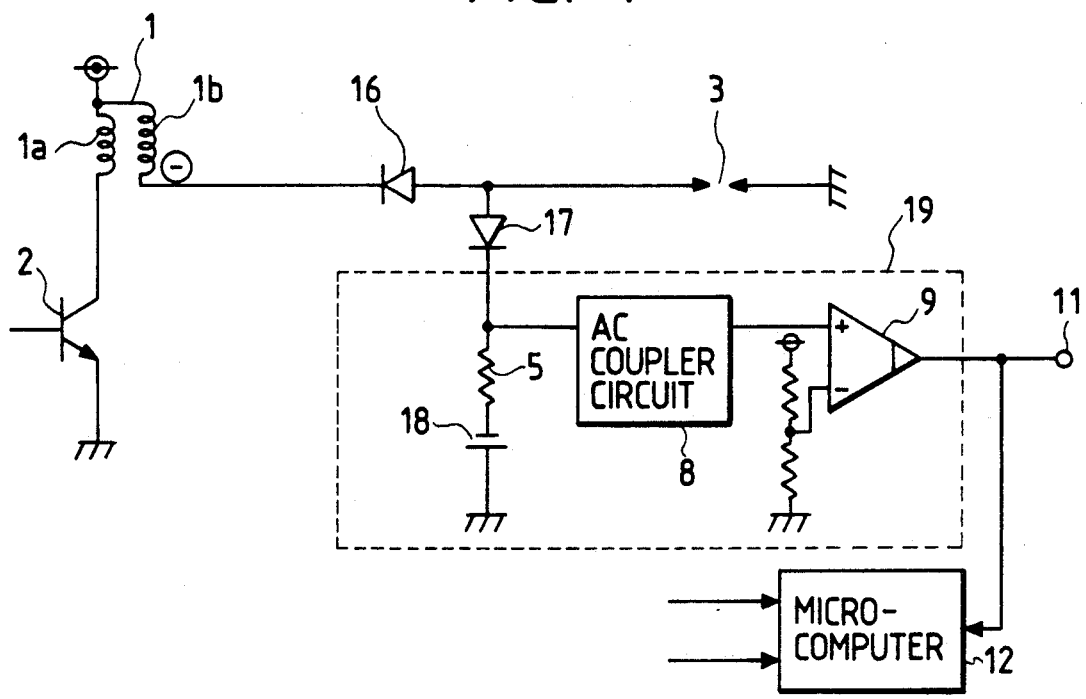
FIG. 4 is a diagram showing the organization of a knocking detector for an internal combustion engine, which is a third embodiment of the invention.

FIG. 4 shows the organization of a third embodiment, in which reference numeral 16 designates a high voltage diode interposed between the spark plug 3 and the secondary side 1b; 17, a high voltage diode interposed between the spark plug 3 and the AC coupler circuit 8; 18, a coil power supply interposed between the resistor 5 and the ground. The resistor 5, the AC coupler circuit 8, the comparator circuit 9, and the coil power supply 18 constitute an ionization current detector circuit 19. Other aspects of the organization are the same as those in the conventional example.

In the above organization, when the power transistor 2 is turned off at an ignition timing of the internal combustion engine, the primary current flowing through the primary side 1a is cut off, which in turn causes a negative high ignition voltage to be generated at the secondary side 1b. As a result, a spark occurs across the electrodes of the spark plug 3, firing the mixed gas in the internal combustion engine. At this point, ionization takes place in association with combustion of the mixed gas, producing ions. Here, the electrodes of the spark plug 3 act as electrodes for detecting the ionization current after the spark. The ionization current flows by the movement of electrons caused by the negatively biased voltage of the coil power supply 18. The same ionization action takes place when knocking occurs with the engine, causing the ionization current to flow.

The generation of the ionization current in turn generates a voltage across the resistor 5. The AC component of this voltage is extracted by the AC coupler circuit 8, and the extracted AC component is compared with the reference level at the comparator circuit 9, whereby a combustion pulse is obtained from the output terminal 11. The combustion pulse is then inputted to the microcomputer 12 to judge knocking from the combustion pulse condition (high or low) after a predetermined time t ms has elapsed from an ignition timing predetermined by the number of revolutions of the engine and the load.

Figure 5:
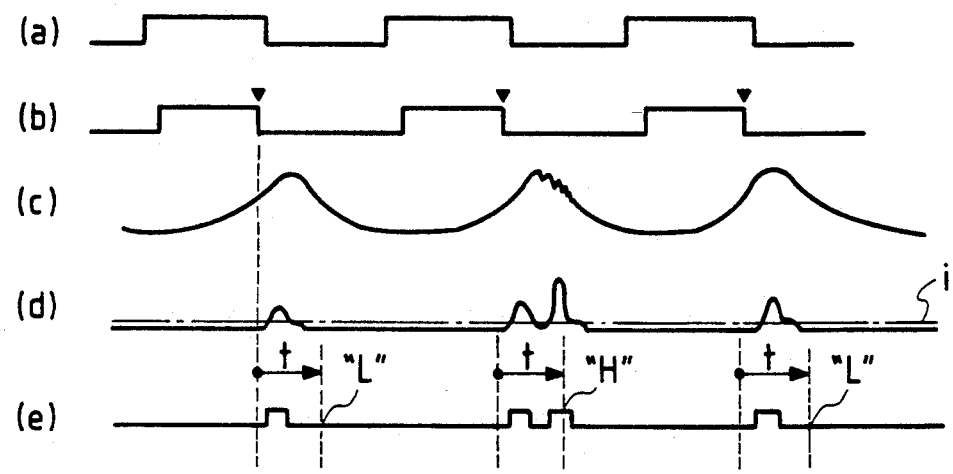
FIG. 5 is a timing chart showing the operation of the knocking detector of FIG. 4.

FIG. 5 is a timing chart showing the above operation, in which a waveform (a) indicates a rotational reference signal; (b), an ignition signal for driving the ignition coil 1; (c), the internal pressure of a cylinder caused by combustion; (d), an ionization current generated by combustion, with (i) being the reference level of the comparator circuit 9; and (e), a combustion pulse, which is an output of the comparator circuit 9. Similarly, if the ionization current is damped soon after the ignition timing, it is judged that knocking has taken place with the combustion pulse being low after the predetermined time t ms, whereas it is judged that no knocking has taken place with the combustion pulse being high.

Embodiment 4

Figure 6:
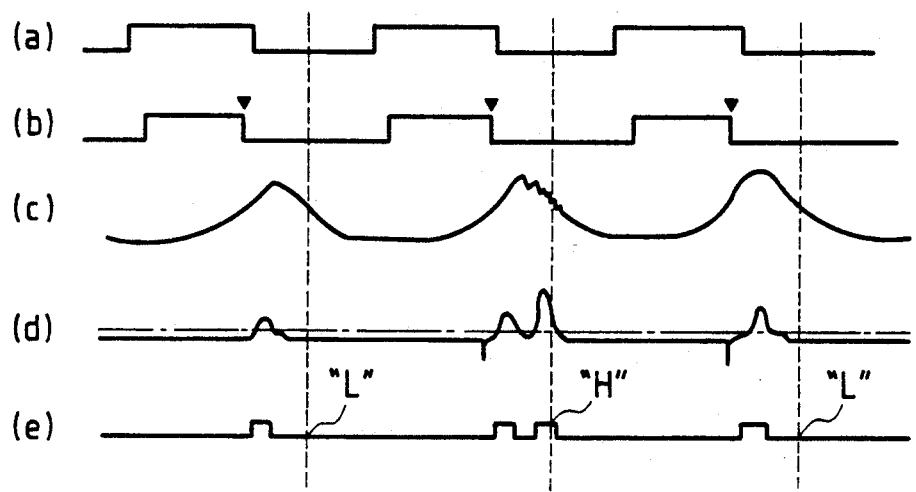
FIG. 6 is a timing chart showing the operation of a knocking detector for an internal combustion engine, which is a fourth embodiment of the invention.

FIG. 6 shows a timing chart of the operation of a fourth embodiment. Occurrence of knocking is judged by a combustion pulse condition that depends on a predetermined crank angle. In this case, since the ignition signal is determined in accordance with the rotational reference signal, occurrence of knocking is judged from a combustion pulse condition after a predetermined crank angle from an ignition timing.

While the organization in which the ionization current detecting means is designed to convert ionization current into voltage by the resistor 5 has been proposed in the respective embodiments, other organizations may of course be applied.

As described above, this invention is characterized as judging the occurrence of knocking from whether or not the ionization current generated at the time of ignition is above a predetermined level after a predetermined time or crank angle (in a range of 10°-20°) from the ignition timing. Therefore, knocking can be detected simply and surely without involving frequency analysis.

While description has been made of the particular embodiments of this invention, it will be understood that many modifications may be made without departing from the spirit thereof. The appended claim is contemplated to cover any such modifications as fall within the true spirit and scope of this invention.

What is claimed is:

1. A knocking detector for an internal combustion engine comprising:
    an ignition coil for generating a high voltage for igniting said internal combustion engine;
    a spark plug for firing a mixed gas in said internal combustion engine by being applied said high ignition voltage to thereby generate a spark at an ignition timing;
    ionization current detecting means for detecting an ionization current through said ignition coil; and
    knocking judging means for judging that knocking has taken place from whether or not said ionization current is above a predetermined level after a predetermined time has elapsed from said ignition timing.

2. A knocking detector for an internal combustion engine comprising:
    an ignition coil for generating a high voltage for igniting said internal combustion engine;
    a spark plug for firing a mixed gas in said internal combustion engine by being applied said high ignition voltage to thereby generate a spark at an ignition timing;

ionization current detecting means for detecting an ionization current through said ignition coil; and knocking judging means for judging that knocking has taken place from whether or not said ionization current is above a predetermined level after a predetermined crank angle from said ignition timing.

3. The knocking detector according to claim 2, wherein said predetermined crank angle is in a range of 10° to 20°.

4. The knocking detector according to claim 1, wherein said high ignition voltage is in a range of 10 to 25 kV.

5. The knocking detector according to claim 2, wherein said high ignition voltage is in a range of 10 to 25 kV.

6. The knocking detector according to claim 1, wherein said ionization current detecting means comprising a capacitor which has an effect of biasing in a range of 50 to 300 V.

7. The knocking detector according to claim 2, wherein said ionization current detecting means comprising a capacitor which has an effect of biasing in a range of 50 to 300 V.

8. The knocking detector according to claim 1, wherein said ignition coil, comprising: a primary side and a second side.

9. The knocking detector according to claim 8, wherein said ionization current detecting means, comprising:

a capacitor, a resistor inserted between said capacitor and a ground, a first diode inserted between said secondary side and a detector power, a secondary diode connected to said resistor, an AC coupler circuit for extracting only an AC component out of said voltage, a comparator circuit for comparing said AC component with a predetermined reference level, a microcomputer for effecting various types of control.

10. The knocking detector according to claim 8, wherein said secondary side is connected to a power diode.

11. The knocking detector according to claim 9, wherein said first diode is a Zener diode.

12. The knocking detector according to claim 2, wherein said ignition coil, comprising: a primary side and a second side.

13. The knocking detector according to claim 12, wherein said ionization current detecting means, comprising:

a capacitor, a resistor inserted between said capacitor and a ground, a first diode inserted between said secondary side and a detector power, a secondary diode connected to said resistor, an AC coupler circuit for extracting only an AC component out of said voltage, a comparator circuit for comparing said AC component with a predetermined reference level, a microcomputer for effecting various types of control.

14. The knocking detector according to claim 12, wherein said secondary side is connected to a power diode.

15. The knocking detector according to claim 13, wherein said first diode is a Zener diode.

* * * * *